July 23, 1963   R. N. ABILD   3,098,353
ROCKET ENGINE PROPELLANT FEEDING AND CONTROL SYSTEM
Filed March 31, 1961
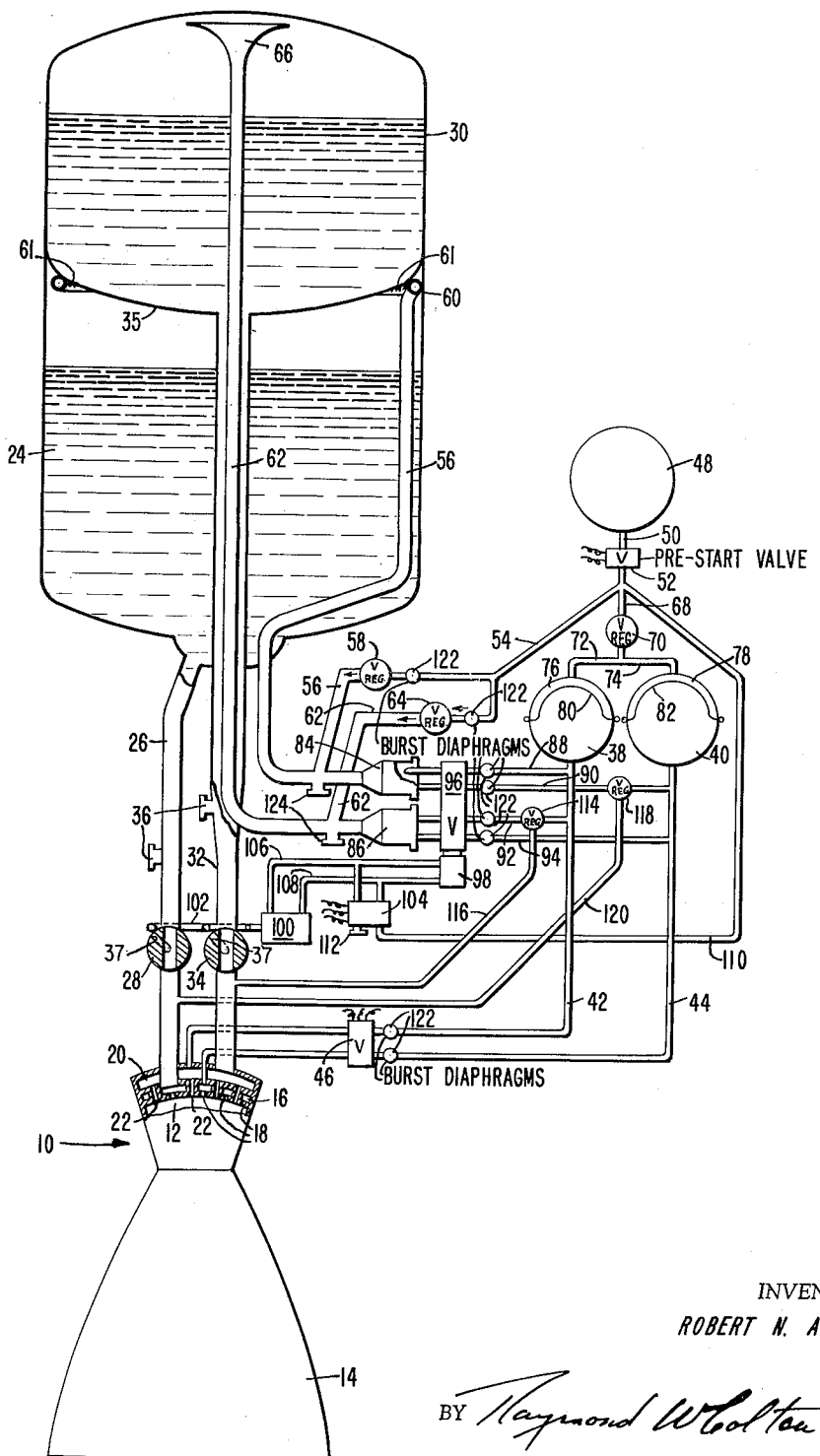
INVENTOR
ROBERT N. ABILD
BY Raymond W Coolton
ATTORNEY United States Patent Office 3,098,353
Patented July 23, 1963

3,098,353
ROCKET ENGINE PROPELLANT FEEDING AND
CONTROL SYSTEM
Robert N. Abild, New Britain, Conn., assignor to United
Aircraft Corporation, East Hartford, Conn., a corporation of Delaware
Filed Mar. 31, 1961, Ser. No. 99,873
13 Claims. (Cl. 60—35.6)

This invention relates to a rocket engine propellant feeding and control system generally, and more specifically to a fast starting dual thrust storable rocket engine.

Rocket engines generally fall into two categories as regards fuel and oxidizer feeding: (1) those employing pumps; and (2) those using pressurized tanks. Each has its advantages and disadvantages. Pumps, while allowing great flexibility and light weight tanks, suffer from the disadvantages of weight and cost of the associated machinery required to be carried by the rocket engine. The use of pressurized tanks requires the carrying of the tank pressurizing means, and the additional space for the pressurizing tanks, and the additional weight to provide the strength for the tanks to withstand the feeding pressure.

It is an object of this invention to provide a propellant feeding and control system having novel features which overcome the disadvantages of the system using pressurized tanks, by use of a system in which a separate relatively small pressurizing tank of inert gas can be used to pressurize the main tanks to effect starting, and to pressurize small auxiliary tanks to assist in subsequent pressurizing of the main fuel and oxidizer tanks.

It is a still further object to provide a novel propellant feeding and control system for a rocket engine which insures a rapid thrust build-up on starting.

It is a still further object to provide a novel propellant feeding and control system for a rocket engine permitting a steady full or partial thrust, as desired.

It is still further object to provide a novel propellant feeding and control system for a rocket engine which permits a rapid thrust termination, and multiple starts at full or partial thrust level.

It is a still further object to provide a novel propellant feeding and control system for a rocket engine enabling the rock engine to be stored while filled with liquid propellants, and which can quickly be pressurized for operation.

Other and further objects of the invention will be apparent from the following description taken in conjunction with the accompanying drawing, in which the single FIGURE diagrammatically represents an arrangement of a hookup of the propellant feeding and control system as applied to a conventional rocket engine.

Referring to the drawing, the numeral 10 designates a rocket engine having a combustion chamber 12 and a reaction nozzle 14. Liquid oxidizer is supplied to the combustion chamber through a manifold 16 and a plurality of injectors 18, and liquid fuel is supplied through a manifold 20 and a plurality of fuel injectors 22.

An oxidizer tank 24, comprising a main source of oxidizer, is connected with the manifold 16 by a supply line 26 having a control valve 28 therein, and a fuel tank 30, comprising a main source of fuel, is connected with the manifold 20 by a supply line 32 having a control valve 34 therein. As shown, the tanks are formed by a single cylindrical container having a partition 35 separating the two tanks or chambers, and the supply line 32 extends from the bottom of the tank 30 and through the oxidizer within the tank 24. This arrangement is preferred because it conserves weight and space, both of which are important in a rocket engine.

The valves 28 and 34 are equipped with tear seals 37, joined to the valves and to their housings, to prevent leakage during the storage period, the seals being ruptured on valve opening. Furthermore, the valves 28 and 34 are disposed closely adjacent the injectors to facilitate very rapid rocket engine starts and terminations.

The supply lines 26 and 32 include fill and drain cocks 36 to facilitate the filling and the draining of the tanks 24 and 30 and the supply lines.

There is also provided a tank 38, comprising an auxiliary source of liquid fuel, and a tank 40 comprising an auxiliary source of liquid oxidizer. The tanks 38 and 40 contain the same type of fuel and oxidizer as the tanks 24 and 30, respectively, or they may contain a different type of fuel and oxidizer, as, for example, a hypergolic fuel and oxidizer. A supply line 42 interconnects the tank 38 and the fuel manifold 20, and a supply line 44 interconnects the tank 40 and the oxidizer manifold 16. A pair of remotely actuated electrically controlled valves 46 are disposed in the supply lines 42 and 44, and may be operated simultaneously or sequentially, as desired.

The several tanks 24, 30, 38 and 40 are pressurized by a nitrogen storage tank 48 having a conduit 50 leading to a remotely controlled pre-start valve 52. A branch conduit 54 from the conduit 50 is connected with a first pressure duct 56, having a pressure regulator 58 therein, leading through the liquid oxidizer in the tank 24 and terminating in a distributor ring 60 having a series of slots 61 in the upper surface, disposed in the upper end of the tank above the level of the liquid oxidizer therein. The branch duct 54 is also connected with a second pressure duct 62, having a pressure regulator 64 therein, and leading through the supply line 32 and through the fuel within the tank 30, terminating in a diffuser 66 in the upper end of the tank above the level of the fuel therein.

A branch duct 68 from the conduit 50 includes a pressure regulator 70, and is connected with a first duct 72 leading to a pressure chamber 76 in the upper end of the auxiliary source of fuel 38. A second duct 74 interconnects the branch duct 68 with a pressure chamber 78 in the upper end of the auxiliary source of oxidizer 40. The tanks 38 and 40 include flexible diaphragms 80 and 82, respectively, which form partitions separating the upper pressure chambers 76 and 78 and the fuel and oxidizer containing chambers below.

The invention also contemplates the provision of a first gas generator 84 and a second gas generator 86 to generate and to supply inert gas under pressure to the main oxidizer and fuel tanks. The gas generator 84 is supplied with fuel from the auxiliary tank 38 by a duct 88 interconnecting the supply line 42 and the gas generator, and is supplied with oxidizer from the auxiliary tank 40 by a duct 90 connected with the supply line 44. Similarly, the gas generator 86 is supplied with fuel and oxidizer from the auxiliary tanks 38 and 40 by the ducts 92 and 94 interconnecting the supply lines 42 and 44 with the generator 86. Interconnected valves 96 in the ducts 88, 90, 92 and 94 are simultaneously operated by a servomotor 98 to open and close the ducts.

A servomotor 100 is connected with the flow control valves 28 and 34 by an operating linkage 102 to effect concurrent opening and closing. The servomotors 98 and 100 are under the control of a remotely actuated pilot valve 104, by way of fluid connections 106 and 108. Pressure fluid for actuating the servomotors is supplied to the pilot valve 104 by a pressure connection 110 leading from the conduit 50. The pilot valve 104 also includes a vent 112 to the ambient atmosphere.

The duct 92 includes a pressure regulator 114 to control the pressure of fuel supplied to the gas generator 86 as a function of the delivery pressure in the supply line 32, there being a pressure connection 116 provided between the pressure regulator 114 and a pressure tap downstream of the flow control valve 34. In like manner, the duct 90 includes a pressure regulator 118 to control the pressure of the oxidizer supplied to the gas generator 84 as a function of the delivery pressure of the oxidizer in the supply line 26, there being a pressure connection 120 interconnecting the pressure regulator 118 and a pressure tap in the supply line 26 downstream of the flow control valve 28.

The pressure ducts 56 and 62, and the ducts 88, 90, 92 and 94, as well as the supply lines 42 and 44, include replaceable burst diaphragms 122 to prevent premature pressurization of the tanks 24 and 30 and to prevent leakage of oxidizer and fuel from the auxiliary tanks 40 and 38 during a period of storage of the rocket engine prior to actual firing. Vents 124 in the pressure ducts 56 and 62 permit venting of the purge gas from the tanks 24 and 30 during filling of the tanks with propellants.

*Operation*

In the inoperative state of the system, springs (not shown) in the servomotors 98 and 100 retain the flow control valves 28 and 34 in their closed position, and the valves 96 between the auxiliary tanks 38 and 40 and the gas generators 84 and 86 in their closed position. The fuel tank 30 and the oxidizer tank 24 may be filled with fuel and oxidizer, respectively, and the rocket engine stored until needed. The pressurizing tank 48 is also filled with nitrogen or other inert gas under pressure, and the auxiliary tanks 38 and 40 are filled with propellants.

When it is desired to place the rocket engine in operation, the pre-start valve 52 is opened. As shown, this valve, as well as all other flow control valves, are capable of being remotely actuated by electrical leads to solenoid actuators. Opening of the valve 52 admits inert gas under pressure into the pressure chambers 76 and 78 to pressurize the fuel and oxidizer in the auxiliary tanks 38 and 40. This results in the destruction of the burst diaphragms 122 at valves 96 and 46. Inert gas under pressure also flows into conduits 56 and 62, destroying the burst diaphragms therein, and pressurizing the spaces above the liquid levels in tanks 24 and 30 to controlled pressure levels as regulated by pressure regulating valves 58 and 64.

For full thrust start, a signal actuates the pilot valve 104 to deliver pressure fluid to open the flow control valves 28 and 34, thereby rupturing the tear seals 37 and opening the valves 96. The same signal opens the valve 46. Fuel and oxidizer from the tanks 30 and 24 are supplied through the lines 32 and 26 to the injectors 22 and 18, and fuel and oxidizer from the auxiliary tanks 38 and 40 are supplied through the lines 42 and 44 to the injectors. If hypergolic propellants are fed from the auxiliary tanks 38 and 40, they will spontaneously ignite when mixed within the combustion chamber 12 to initiate combustion. Otherwise, a conventional igniter, not shown, will be energized to initiate combustion in a well known manner. The opening of the valves 96 permits the feeding of fuel and oxidizer into the gas generators 84 and 86, wherein they are ignited and burned to form inert products of combustion. If the fuel and oxidizer are not spontaneously combustible, an igniter, not shown, will be energized in each generator. The pressure of the oxidizer and fuel supplied to the gas generators is controlled as a function of the delivery pressure in the supply lines 26 and 32, which pressure is effective, by way of the pressure lines 120 and 116, to regulate the delivery pressure of the pressure regulators 118 and 114, respectively. When pressure builds up within the gas generators 84 and 86, the delivery of nitrogen through the branch duct 54 and pressure ducts 56 and 62 ceases, and the gas generators continue to supply inert gas under pressure to pressurize the main fuel and oxidizer tanks.

For large values of partial thrust, only the main sources of fuel and oxidizer are used. Energization of the remotely actuated pilot valve 104 operates the servomotors 98 and 100 to open the flow control valves 28, 34 and 96, admitting liquid oxidizer and fuel from the tanks 24 and 30 to the injectors 18 and 22, and admitting oxidizer and fuel from the auxiliary tanks 40 and 38 to the gas generators 84 and 86 to produce an inert gas to pressurize the tanks 24 and 30. For smaller values of partial thrust, the pilot valve 104 is signaled to close the flow control valves 28, 34 and 96 to terminate main propellant flow and pressurization of the tanks by the gas generators 84 and 86, and remotely controlled valve 46 is actuated to permit flow of auxiliary fuel and oxidizer from tanks 38 and 40 to the injectors 22 and 18, with tank pressurization provided by flow of stored nitrogen through conduits 56 and 62. Under zero gravity conditions, the thrust will provide acceleration which forces the liquid propellants to remain at the discharge ends of the tanks to fill the main tank outlets. The flexible diaphragms in the auxiliary tanks serve the same purpose.

The initial tank pressurizing upon starting provided by stored nitrogen pressure from tank 48 forces the main propellants in tanks 30 and 24 to start flowing immediately and continues pressure feeding until the gas generators build up pressure, which stops further delivery of nitrogen from the tank 48. It is evident, therefore, that tank 48 can be relatively small.

From the foregoing, it is evident that I have devised a fuel feeding and control system for a rocket engine which contains novel features to insure very rapid thrust build-up steady full or partial thrust as desired, rapid thrust termination, multiple starts with either full or partial thrust, and storability while filled with propellants. The location of the propellant valves 28, 34 and 46 close to the injectors, and the absence of regenerative cooling of the thrust chamber and nozzle, make rapid thrust initiation and termination possible. Lack of possible leakage during storage is assured by the provision of replaceable burst diaphragms in the flow lines and tear seals on the flow control valves in the propellant flow lines.

Having fully described my invention, it is to be understood that I do not wish to be limited to the details herein set forth, but that my invention is of the full scope of the appended claims.

I claim:

1. A rocket engine, comprising: a combustion chamber having an oxidizer injector and a fuel injector therein; and, a propellant feeding and control system including a main source of liquid oxidizer; a main source of liquid fuel; first separate means connecting said main sources of liquid oxidizer and liquid fuel with said oxidizer injector and said fuel injector, respectively, including a flow control valve in each connecting means; an auxiliary source of liquid oxidizer; an auxiliary source of liquid fuel; second separate means connecting said auxiliary sources of liquid oxidizer and liquid fuel with said oxidizer injector and said fuel injector, respectively, to supply oxidizer and fuel to said combustion chamber, including a flow control valve in each connection; common means to pressurize said main and said auxiliary sources of liquid oxidizer and liquid fuel, including a source of gas under pressure and interconnecting valve controlled connections; and selectively operable means to open and close the valve controlled connections between said source of gas and said main and auxiliary sources of oxidizer and fuel, and to open and close said valves in said first and said second connecting means, whereby oxidizer and fuel from said main sources or from said auxiliary sources or from both of said sources, may be selectively supplied to said combustion chamber through said injectors.

2. A rocket engine as defined in claim 1, in which said pressurizing means includes automatic pressure regulators.

3. A rocket engine as defined in claim 1, in which said auxiliary oxidizer source and said auxiliary fuel source contain hypergolic propellants.

4. A rocket engine as defined in claim 1, including a second source of pressurized gas having gas generating means, and means interconnecting said gas generating means with said main oxidizer and fuel sources.

5. A rocket engine as defined in claim 1, including a second source of pressurizing gas having gas generating means supplied with oxidizer and fuel from said auxiliary sources, and means interconnecting said gas generating means with said main oxidizer and fuel sources.

6. A propellant feeding and control system as defined in claim 5, including fluid flow control means responsive to the supply pressures to said fuel and oxidizer injectors, respectively, between said auxiliary sources and said gas generating means.

7. A propellant feeding and control system for a rocket engine having an oxidizer injector and a fuel injector therein, comprising: a main source of liquid oxidizer; a main source of liquid fuel; a first supply means conducting oxidizer from said main oxidizer source and a second supply means conducting fuel from said main fuel source; an auxiliary source of liquid oxidizer; an auxiliary source of liquid fuel; a first source of pressurizing gas; means connecting said first source of pressurizing gas with said main sources and with said auxiliary sources of oxidizer and fuel; a second source of pressurizing gas including combustion means; means connecting said second source of pressurizing gas with said main sources of oxidizer and fuel; and means connecting said auxiliary sources of oxidizer and fuel with said second source of pressurizing gas.

8. A propellant feeding and control system as defined in claim 7, in which said combustion means comprises a pair of combustion chambers, in which said means connecting said auxiliary sources of oxidizer and fuel with said second source of pressurizing gas includes separate valved conduits to each of said pair of combustion chambers, and in which said means connecting said second source of pressurizing gas with said main sources of oxidizer and fuel comprises a first conduit interconnecting one of said pair of combustion chambers and said main source of oxidizer, and a second conduit interconnecting the other of said pair of combustion chambers and said main source of fuel.

9. A propellant feeding and control system as defined in claim 8, in which said means connecting said first source of pressurizing gas with said main sources of oxidizer and fuel join said first and said second conduits and include automatic pressure regulating means, and in which said means interconnecting said auxiliary sources of oxidizer and fuel with said second source of pressurized gas includes automatic pressure regulating means.

10. A propellant feeding and control system as defined in claim 7, in which said means connecting said main source of oxidizer and fuel with said injectors includes fluid control means, and in which said means interconnecting said auxiliary sources of oxidizer and fuel with said second source of pressurized gas includes fluid control means, and interconnecting means simultaneously opening and closing both of said fluid control means.

11. A propellant feeding and control system as defined in claim 7, including connecting means between said auxiliary sources of oxidizer and fuel and said oxidizer and fuel injectors, respectively, and selectively operable means in said connecting means to regulate the fluid flow therethrough.

12. A propellant feeding and control system as defined in claim 7, including automatic pressure regulators in said means connecting said first source of pressurizing gas with said main sources and said auxiliary sources of oxidizer and fuel.

13. A propellant feeding and control system as defined in claim 7, in which said second source of pressurizing gas includes a first combustion chamber and a second combustion chamber, in which said means connecting said second source of pressurizing gas with said main sources of oxidizer and fuel includes a first fluid connection between said first combustion chamber and said main source of oxidizer and a second fluid connection between said second combustion chamber and said main source of fuel, and in which said means connecting said auxiliary sources of oxidizer and fuel with said second source of pressurizing gas includes a first pair of conduits between said first combustion chamber and said auxiliary sources of oxidizer and fuel, respectively, and a second pair of conduits between said second combustion chamber and said auxiliary sources of oxidizer and fuel, respectively, a first pressure regulator in the conduit interconnecting said first combustion chamber and said auxiliary source of oxidizer, a second pressure regulator in the conduit interconnecting said second combustion chamber and said auxiliary source of fuel, a first means, responsive to the pressure in said first supply means, controlling said first pressure regulator, and a second means, responsive to the pressure in said second supply means, controlling said second pressure regulator.

References Cited in the file of this patent

UNITED STATES PATENTS

| | | |
|---|---|---|
| 2,408,111 | Truax et al. | Sept. 24, 1946 |
| 2,574,495 | Parker | Nov. 13, 1951 |
| 2,794,318 | Zucrow et al. | June 4, 1957 |
| 2,808,700 | Kretschmer | Oct. 8, 1957 |
| 2,816,417 | Bloomberg | Dec. 17, 1957 |
| 2,852,916 | Hearn et al. | Sept. 23, 1958 |
| 2,897,649 | Reddy | Aug. 4, 1959 |
| 2,935,846 | Neale et al. | May 10, 1960 |